(12) United States Patent  
Castells de Monet et al.

(10) Patent No.: US 10,792,942 B2  
(45) Date of Patent: Oct. 6, 2020

(54) MEASURING THE THICKNESS OF A PRINT MEDIA

(71) Applicant: HEWLETT-PACKARD DEVELOPMENT COMPANY, L.P., Spring, TX (US)

(72) Inventors: Raimon Castells de Monet, Sant Cugat del Valles (ES); David Faundez Barroso, Sant Cugat del Valles (ES); David Munoz Navarro, Sant Cugat del Valles (ES); Marco Ignacio Barbetta, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/340,640

(22) PCT Filed: Jan. 19, 2017

(86) PCT No.: PCT/US2017/014102  
§ 371 (c)(1),  
(2) Date: Apr. 9, 2019

(87) PCT Pub. No.: WO2018/136065  
PCT Pub. Date: Jul. 26, 2018

(65) Prior Publication Data  
US 2019/0241000 A1    Aug. 8, 2019

(51) Int. Cl.  
*B41J 25/308*  (2006.01)  
*G01B 5/06*    (2006.01)  
*B41J 11/00*   (2006.01)

(52) U.S. Cl.  
CPC ......... *B41J 25/308* (2013.01); *B41J 11/0095* (2013.01); *G01B 5/06* (2013.01)

(58) Field of Classification Search  
CPC ........ B41J 25/308; B41J 11/0095; G01B 5/06  
See application file for complete search history.

(56) References Cited

U.S. PATENT DOCUMENTS 5,445,458 A * 8/1995 Uchiyama ............... B41J 25/308  
                                                    400/55  
6,381,423 B1 * 4/2002 Eom .................... G03G 15/167  
                                                    271/265.04

(Continued)

FOREIGN PATENT DOCUMENTS

CN    101676117 A    3/2010  
JP    2006259483 A   9/2006

(Continued)

OTHER PUBLICATIONS

HPDC, "International Search Report and Written Opinion," dated Oct. 26, 2017, International App. No. PCT/US2017/014102, 7 p.

*Primary Examiner* — Julian D Huffman  
(74) *Attorney, Agent, or Firm* — HP Inc. Patent Department

(57) ABSTRACT

Measuring the thickness of a print media supported by a platen or belt by: moving a measurement bar to a first position to contact a surface of the platen or belt, moving the measurement bar to a second position to contact a surface of the print media when supported by the platen or belt, and determining the spatial difference between the first and second positions such as to measure the thickness of the print media. The measurement bar is arranged to cover a width of the print media when supported by the platen or belt.

13 Claims, 5 Drawing Sheets

(56) References Cited

U.S. PATENT DOCUMENTS

| | | | |
|---|---|---|---|
| 7,290,949 B1 | 11/2007 | Phillips et al. | |
| 8,186,787 B2 | 5/2012 | Holbrook et al. | |
| 8,757,746 B2 | 6/2014 | Wing et al. | |
| 8,888,212 B2 | 11/2014 | MacKenzie et al. | |
| 9,216,574 B2 | 12/2015 | Tunnicliffe-Wilson et al. | |
| 9,291,587 B2 | 3/2016 | Spath et al. | |
| 9,409,389 B1 | 8/2016 | Donaldson et al. | |
| 9,802,427 B1* | 10/2017 | Lim | B41J 2/325 |
| 2003/0007023 A1* | 1/2003 | Barclay | B41J 2/17509 |
| | | | 347/8 |
| 2006/0232623 A1* | 10/2006 | Murcia | B41J 25/308 |
| | | | 347/20 |
| 2010/0067948 A1 | 3/2010 | Jones et al. | |

FOREIGN PATENT DOCUMENTS

| | | |
|---|---|---|
| JP | 2011173347 A | 9/2011 |
| RU | 2034234 C1 | 4/1995 |

\* cited by examiner

MEASURING THE THICKNESS OF A PRINT MEDIA

Rigid substrates for printing are a family of print media with a large variety of materials, widths and thicknesses. The measurement of print media thickness provides useful information to determine and adjust the distance between printhead and print media, for example to prevent the printhead from colliding with the print media during printing operations and to improve print quality. Moreover, measuring the print media thickness can provide useful information for monitoring the dimensions and quality of print media, and also before and after printing operations, for example to reject damaged print media prior to printing or to protect printer systems from being overloaded or fed with unsuitable print media formats.

The print media thickness measurement can be performed manually or automatically, and can be based on determining the print media type, weight or thickness, or other print media properties.

BRIEF DESCRIPTION OF DRAWINGS

Certain examples are described in the following detailed description and in reference to the drawings, in which.

DETAILED DESCRIPTION

Manually measuring the print media thickness, for example by using a caliper, and manually introducing the measurement into a printing program before loading the print media for printing, can be prone to human errors, both in the measuring process and when inputting the measured values into the printing program.

An automated measurement arrangement for measuring the print media thickness relies less on human activity, and thus circumvents human errors. For example, a free wheel can be automatically moved to alternately press against the top surface of the print media supported by a conveyor belt, and against the conveyor belt itself when no print media is present under the wheel. The difference between both positions can be used to determine the print media thickness. However, as the measurement is performed locally under the free wheel, any deviation along the print media width which does not pass under the free wheel remains undetected by the thickness measurement. Hence, the free wheel may fail to capture the worst case of print media thickness in one complete section of the media. Moreover, the precision and reliability of the print media thickness measurement can also be affected by the measurement accuracy of transducer sensors used in the respective measurement arrangement, for example because of the transducer sensors being sensitive to temperature.

Figure 1:
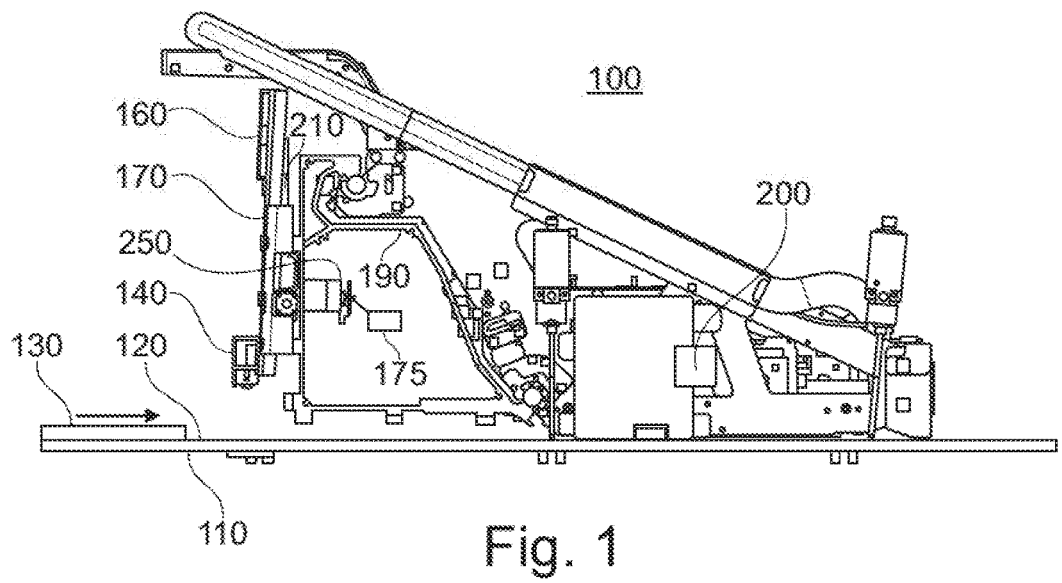
FIG. 1 shows a side view of an example of a system comprising a platen or belt having a surface to support a print media.

FIG. 1 shows a side view of an example of a system 100 comprising a platen or belt 110 having a surface 120 to support a print media 130. The print media 130 can represent any rigid substrate suitable for printing, for example a paper sheet, a plastic sheet, a cardboard, or stacks of substrates. The system 100 shown in FIG. 1 comprises a measurement bar 140 arranged to cover a width of the print media 130 when supported by the platen or belt 110. In other words, the measurement bar 140 extends to cover a complete width of the print media 130 when the print media is being supported by the platen or belt 110. For example, the platen or belt 110 can represent a conveyor belt 110 which can be moved to convey the print media 130 towards the measurement bar 140, see direction indicated in FIG. 1. In this example, the width of the print media 130 corresponds to the distance between opposite edges of the print media 130 measured in a direction perpendicular to the direction of movement of the conveyor belt 110.

Figure 2A:
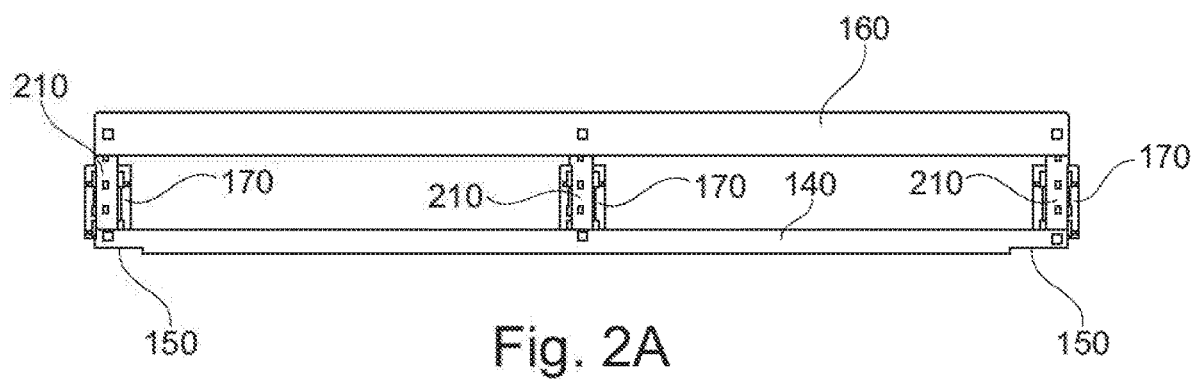
FIG. 2A shows a front view of an example of a measurement bar providing an elongate structure.
Figure 2B:
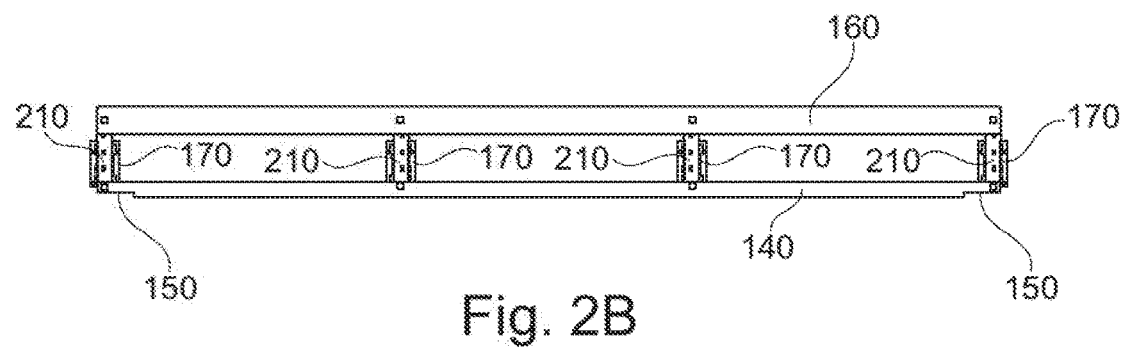
FIG. 2B shows a front view of a further example of a measurement bar providing an elongate structure.

FIGS. 2A and 2B show a front view of two examples of the measurement bar 140 providing an elongate structure having a length sufficient to cover the width of the print media 130. If the print media 130 would be arranged under the measurement bar 140, the print media 130 can be fully covered by the measurement bar 150 such that both ends 150 of the measurement bar 140 extend to or beyond the edges of the print media 130. Accordingly, the measurement bar 140 can be arranged in parallel with said surface 120 of the platen or belt 110 to cover the width of the print media 130 when supported by the platen or belt 110.

The width of the print media 130 depends on the format and type of print media 130 being printed, and can depend on the configuration of the print zone and the maximum format of a print media 130 which can be processed in a respective printer. For example, if the width of the print media 130 is 30 cm, 180 cm, or 265 cm, the corresponding length of the measurement bar 140 could amount to at least 30 cm, 180 cm, or 265 cm, respectively, such as to allow the measurement bar 140 to fully cover the width of the print media 130. In an example, the length of the measurement bar 140 is about the same as the maximum width of a print media 130 of a respective printer or about 1 to 10 mm larger than the maximum width.

The measurement bar 140 shown in FIG. 2A or 2B is supported by a reinforcement bar 160 arranged in parallel with and coupled to the measurement bar 140. In this way, the reinforcement bar 160 can provide structural support to the measurement bar 140. In an example, the reinforcement bar 160 is an aluminum beam that stiffens the system to prevent deformation in the measuring, such as to improve the accuracy of measurement. The reinforcement bar 160 can be particularly useful when the measurement bar 140 is dimensioned to cover wider print media 130 formats, such as for example 30 cm, 180 cm, or 265 cm or wider print media 130 formats.

In the example shown in FIG. 1, the system 100 comprises guiding elements 170 which are arranged to guide a movement of the measurement bar 140. For this purpose, the system 100 comprises a measurement unit 175 that controls movements of the measurement bar 140 to perform the media thickness measurement. In an example, the measurement unit 175 represents a controller implemented using a processor or controller circuit, for example a printer processor. As shown in FIG. 1, in this example, the measurement unit 175 can be coupled to the measurement bar 140 by an electrical motor 250, wherein the measurement unit 175 controls the electrical motor 250 to move the measurement bar 140. In an example, the measurement unit 175 controls a plurality of electrical motors 250 to move the measurement bar 140. The measurement unit 175 can be included in a control unit of the system 100, such as for example included in a printer controller of a printer system, or can be implemented as an external processing unit, or as a decentralized control unit, wherein the decentralized control unit communicates with a centralized control unit and is implemented in or close to an electrical motor 250. The coupling between the measurement unit 175 and the electrical motor 250 can be wired or wireless, for example a wired bus connection coupling electrical components of the system 100 to a processing unit, or to a plurality of processing units.

Figure 3:
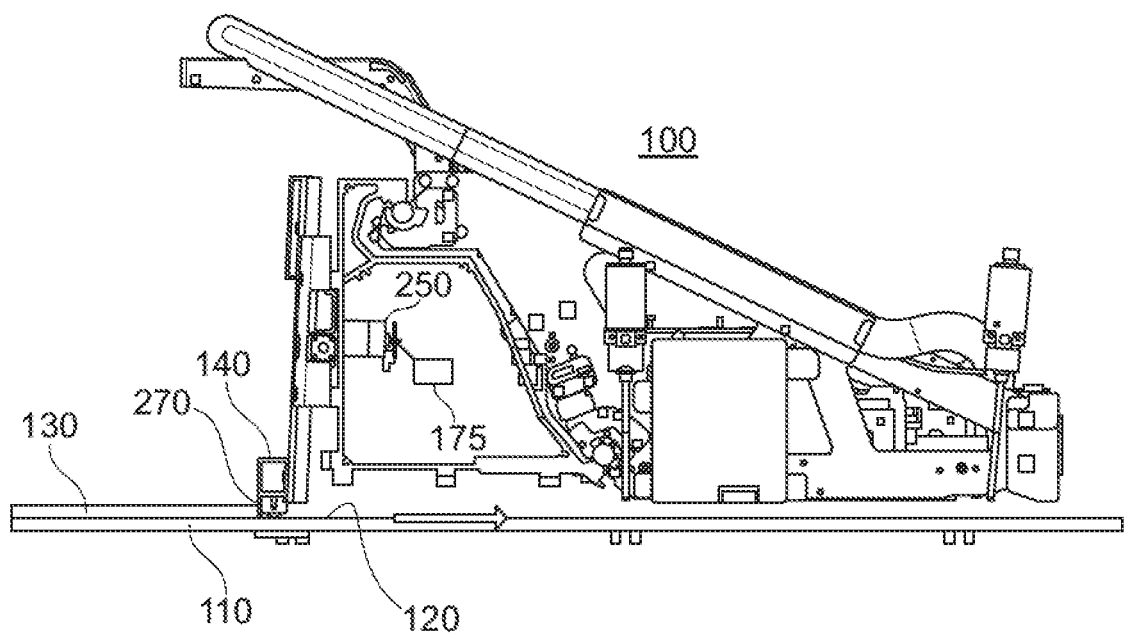
FIG. 3 shows an example of a measurement bar contacting a surface of the platen or belt.

In an example, the measurement unit 175 is coupled to the measurement bar 140 such as to: move the measurement bar 140 to a first position such that the measurement bar 140 contacts the surface 120 of the platen or belt 110; see example shown in FIG. 3. For this purpose, the area of the surface 120 being contacted by the measurement bar 140 does not support the print media 130 at the time of contact, while other regions of the surface 120 may support the print media 130. For example, FIG. 3 shows how the measurement bar 140 is moved to touch an area of the surface 120 which is not covered by the print media 130. More specifically, the print media 130 is shown in FIG. 3 to be positioned to the left of the respective contact area.

Figure 4:
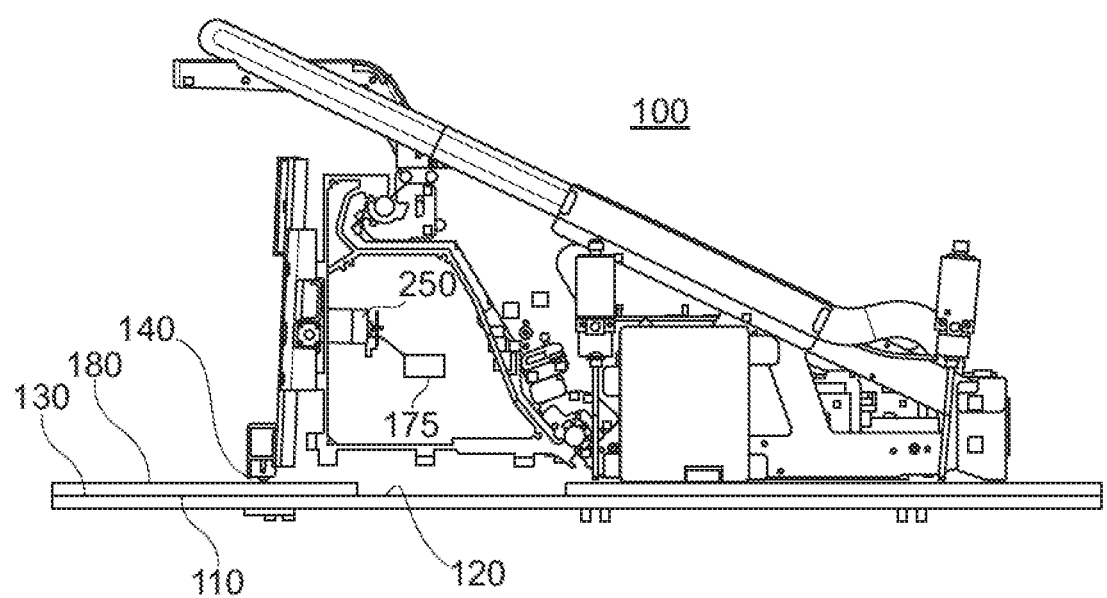
FIG. 4 shows an example of a measurement bar contacting a surface of the print media.

The measurement unit 175 further moves the measurement bar 140 to a second position such that the measurement bar 140 contacts a surface 180 of the print media 130 when supported by the surface 120 of the platen or belt 110; see example shown in FIG. 4. For this purpose, in an example, the measurement bar 140 can first be moved away from the platen or belt 110 such as to provide a gap allowing the conveyor belt 110 to move the print media 130 into the gap between the measurement bar 140 and conveyor belt 110. Then, the measurement bar 140 can be moved to abut the surface 180 of the print media 130, such as to arrive at the second position shown in FIG. 4. In an example, the print media 130 shown in FIG. 4 is moving towards to the measurement bar 140. However, in a different example, the print media 130 can be stationary when the measurement bar 140 is moved to abut its surface 180.

The thickness of the print media 130 is measured by the measurement unit 175 by determining the spatial difference between the first and second positions of the measurement bar 140. In the example shown in FIGS. 3 and 4, the spatial difference corresponds to the vertical offset between the measurement bar 140 abutting the surface 120 of the platen or belt 110 (as shown in FIG. 3) and the measurement bar 140 abutting the surface 180 of the print media 130 (as shown in FIG. 4). In an example, the vertical offset representing the spatial difference can be determined by distance sensing sensors, such as for example by linear encoders. In an example, the distance sensing sensors, such as for example linear encoders, are arranged at one or both distal ends of the measurement bar 140 or reinforcement bar 160, for example in guiding elements 170 arranged at the ends of the measurement bar 140; see FIGS. 2A and 2B. In this way, the distance sensors are displaced from the center of the print media 130 reducing the influence of temperature changes between ambient and printing conditions, i.e. from room to printing temperature, on the measurement results. However, in a different example, the distance sensing sensors, such as for example the linear encoders, are arranged closer to or at the center of the print media 130, for example in the center guiding element 170 shown in FIG. 2A.

In other words, the thickness of the print media 130 is measured by moving a measurement bar 140, covering the width of the print media 130, to contact the surface 120 of the platen or belt 110, and to contact the surface 180 of the print media 130, such as to determine the thickness of the print media 130. By performing the measurement by using a measurement bar 140 that covers the width of the print media 130, the measurement captures any shape or protrusion in the print media 130, platen or belt 110 representing the thickest point of the print media 130. Hence, the worst-case print media thickness is delivered in an efficient and accurate manner, allowing a precise and reliable operation of the system. Moreover, as the measurement bar 140 can be dimensioned to cover all widths of print media 130 which can be processed by the system 100, the print media 130 to be printed can be placed in any position on the platen or belt 110 without affecting the process or precision of thickness measurement. Hence, the process of measuring the print media thickness is efficient and is performed in a process which can be integrated in the system operation as a part of the natural printing flow. In fact, the thickness measurement can be automated to perform the measurement in a fast manner, for example the positioning of the measurement bar 140 to abut the print media 130 prior to printing can be quickly performed in automation, resulting in an efficient and reliable operation of the system, less affected by human errors.

The example of a system 100 shown in FIG. 1 further comprises a slider beam 190, and a carriage 200 including a printhead, wherein the carriage 200 is movably mounted on the slider beam 190 to allow scanning of the printhead. In an example, the slider beam 190 is arranged in parallel with the surface 120 of the platen or belt 110 such as to allow scanning of the printhead at a distance over the print media 130 during printing operations. For this purpose, an adjustment unit (not shown in figures) adjusts the distance between the printhead and print media 130. In an example, the adjustment unit adjusts the distance between the printhead and print media 130 by using the measured thickness of the print media 130. As the measurement delivers the worst-case print media thickness, the distance between the printhead and print media 130 can be adjusted to allow a precise, safe and reliable operation of the system.

As mentioned above, the system 100 shown in FIG. 1 can comprise guiding elements 170 which are arranged to guide the movement of the measurement bar 140. As shown in FIG. 1, the guiding elements 170 can be arranged to provide a mechanical coupling between the measurement bar 140 and the slider beam 190, reinforcing the measurement arrangement in a compact manner.

In the examples shown in FIGS. 2A and 2B, a plurality of guiding elements 170 can be arranged at fixed or variable intervals to cover the length of the measurement bar 140 such as to distribute the weight and/or guiding forces on a plurality of guiding elements 170, improving the robustness and guidance of the measurement arrangement. In FIGS. 2A and 2B, the guiding elements 170 are slidably mounted to the measurement bar 140 at connection bars 210 coupling the measurement bar 140 to the reinforcement bar 160. This arrangement is also shown in FIG. 1.

Figure 5:
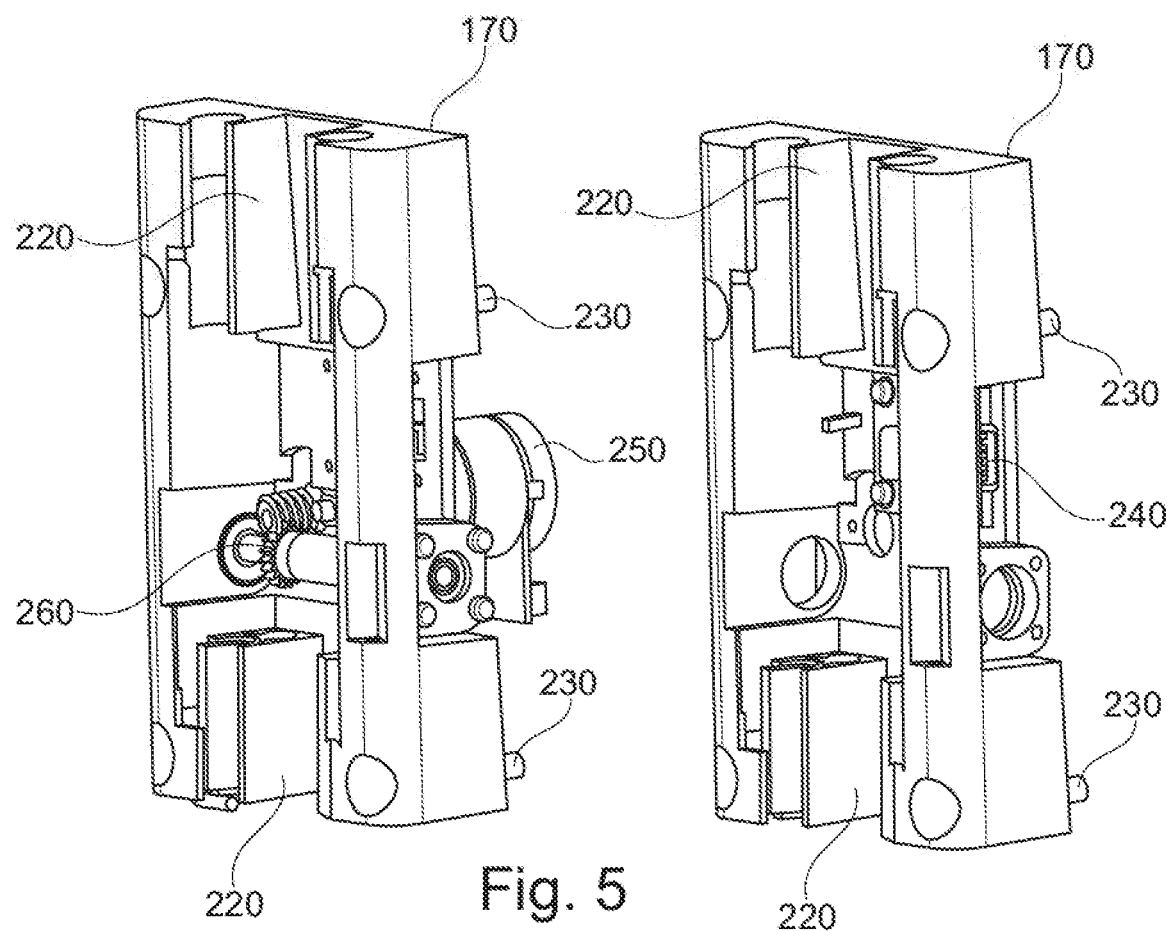
FIG. 5 shows examples of guiding elements.

FIG. 5 shows two corresponding examples of guiding elements 170 both having a mounting surface with fixing elements 230 for mounting the guiding elements 170 to the slider beam 190, and slider portions 220 for slidably mounting each of the guiding elements 170 to the measurement bar 140 at one of the connection bars 210 shown in FIGS. 2A and 2B. More specifically, each of the guiding elements 170 can be attached to the slider beam 190 and includes a slider portion 220 for receiving one of the connection bars 210 in a slidable manner. FIG. 2A and FIG. 2B show three and four guiding elements 170 being arranged, respectively, to provide the slidable coupling between the measurement bar 140 and slider beam 190. However, a single guiding element 170 could also be used for providing the coupling, whereas using a larger number of guiding elements 170, such as for example three, four, or a larger number of guiding elements 170, can improve the stability and robustness of the coupling.

As mentioned above, in an example, a guiding element 170 can comprise a distance sensing sensors, such as for example a linear encoder, for measuring the vertical offset representing the spatial difference between the measurement bar 140 abutting the surface 120 of the platen or belt 110 (as shown in FIG. 3) and the measurement bar 140 abutting the surface 180 of the print media 130 (as shown in FIG. 4). For this purpose, one of the guiding elements 170 shown in FIG. 5 includes a measurement port 240 electrically connected to a distance sensing sensor of the guiding element 170, such as for example a linear encoder, for collecting measurements made by the distance sensing sensor.

In an example, a guiding element 170 is motorized to drive the movement of the measurement bar 140. In this regard, one of the examples of guiding elements 170 shown in FIG. 5 includes an electrical motor 250 which can be operated to move the measurement bar 140 relatively to the slider beam 190. The electrical motor 250 can be coupled to a respective connection bar 210, for example by a mechanical gear 260 coupling the electrical motor 250 to the connection bar 210, such that the electrical motor 260 can apply a torque to the mechanical gear 260 to move the measurement bar 140.

In an example, the torque applied by the electrical motor 250 can be determined or estimated, for example by using electrical circuits implemented in the electrical motor 250 to determine the electrical current and/or electrical voltage driving the electrical motor 250. Determining or estimating the electrical torque applied by the electrical motor 250 allows detecting if the measurement bar 140 has made contact with a surface, for example with the surface 120 of the platen or belt 110, or the surface 180 of the print media 130. More specifically, if the measurement bar 140 is moved to abut a surface, the electrical motor 250 will experience a mechanical resistance affecting the torque of the electrical motor 250, which can be detected and used for touch detection in a precise and efficient manner.

Figure 6:
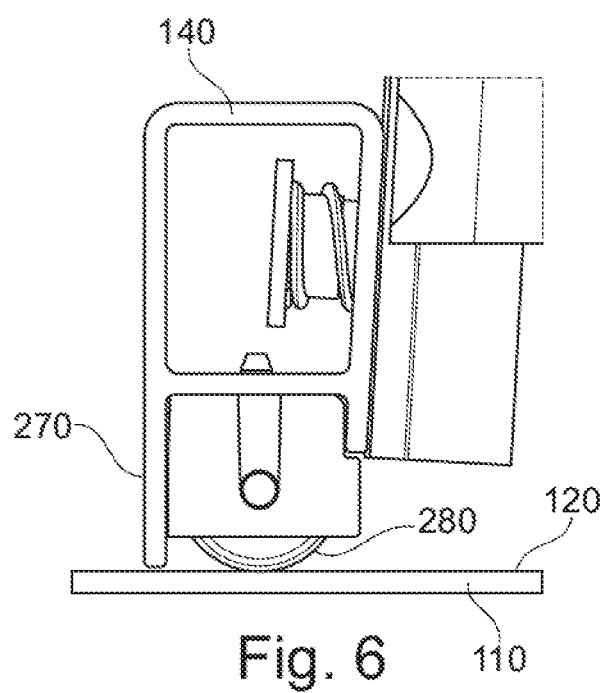
FIG. 6 shows an example of a measurement bar comprising an alignment surface and roller.

FIG. 6 shows an example of a measurement bar 140 having an alignment surface 270 to align the print media 130. For example, as explained above, the measurement bar 140 can be moved to a first position to make contact with the surface 120 of the platen or belt 110. In this first position, the alignment surface 270 of the measurement bar 140 can be used for aligning the print media 130 along the alignment surface 270. An example of this aligning is shown in FIG. 3, wherein the belt 110 or an operator can move the print media 130 to align against the alignment surface 270 of the measurement bar, when the measurement bar 140 has been moved to make contact with the surface 120 of the conveyor belt 110. In this way, the measurement bar 140 can be used for aligning the print media 130 and for measuring the thickness of the print media 130 in a combined manner, enhancing the efficiency of operating the system 100.

In the example shown in FIG. 6, the measurement bar 140 comprises a roller 280 which is arranged to make contact with a surface, for example with the surface 120 of the platen or belt 110, or with the surface 180 of the print media 130. This is particularly useful when the measurement bar 140 is moved to make contact with an advancing belt 110, wherein the roller 280 makes the contact and rolls over the belt 110 to reduce the friction and wear of both parts. The measurement bar 140 can have a plurality of rollers 280 arranged to make the contact with the surface. In the case of a plurality of rollers 280, the rollers 280 are arranged to densely cover the contact area of the respective surface, such as to have the measurement bar 140 capture the worst-case thickness measurement discussed above. Using a plurality of rollers 280 can simplify the insertion, maintenance and replacement of bearings and individual rollers 280. In an example, the width of each roller 280 can be between 5 cm and 15 cm, or between 15 cm and 30 cm, for example, about 9 cm or about 20 cm.

FIG. 4 shows in an example how the measurement unit 175 moves the measurement bar 140 to the surface 180 of the print media 130, for example when the belt 110 is operated to move the print media 130 from the measurement bar 140 towards the printhead for printing. In this way, the measurement bar 140 can be used as a cover or a protection unit during operation of the system 100, for example to prevent a user of the system 100 to be drawn into hazardous areas of the system, and/or to prevent undesired objects from entering and damaging the system 100. In this example, the measurement bar 140 can be moved to abut the surface 180 of the print media 130 during operation, for example by the roller 270 shown in FIG. 6. Alternatively, the measurement bar 140 can be moved to the surface 180 of the print media 130 to provide a gap between the measurement bar 140 and the surface 180 of the print media 130, for example a gap between 2 to 3 mm, to avoid print media 130 deformation due to the roller 270 pressing against the print media surface 180. For example, the measurement bar 140 can prevent undesired objects, such as for example oversized print media 130, from being drawn into and damaging the system 100, for example during continuous printing when a print media 130 is being printed while another print media 130 in being introduced to the system 100. Similarly, the measurement bar 140 can be moved to the surface 120 of the platen or belt 110 to provide user and/system protection during printing operations.

In an example, the system 100 is a printer system comprising: a platen or belt 110 having a surface 120 to support a print media 130; a measurement bar 140 arranged to cover a width of the print media 130 when supported by the platen or belt 110; a slider beam 190 arranged in parallel with said surface 120 of the platen or belt 110; a carriage 200 including a printhead, wherein the carriage 200 is movably mounted on the slider beam 190 to allow scanning of the printhead; and a measurement unit 175 coupled to the measurement bar 140 such as to: move the measurement bar 140 to a first position to contact said surface 120 of the platen or belt 110, move the measurement bar 140 to a second position to contact a surface 180 of the print media 110 when supported by the platen or belt 110, and measure the thickness of the print media 130 by determining the spatial difference between the first and second positions, wherein the measurement bar 140 has an alignment surface 270 to align the print media 130 along the alignment surface 270 when the measurement bar 140 has been moved to said first position, and wherein the measurement unit 175 is coupled to the measurement bar 140 to move the measurement bar 140 to a surface 180 of the print media 130 for providing user or system protection when the print media 130 is being moved from the measurement bar 140 towards the printhead for printing.

Figure 7:
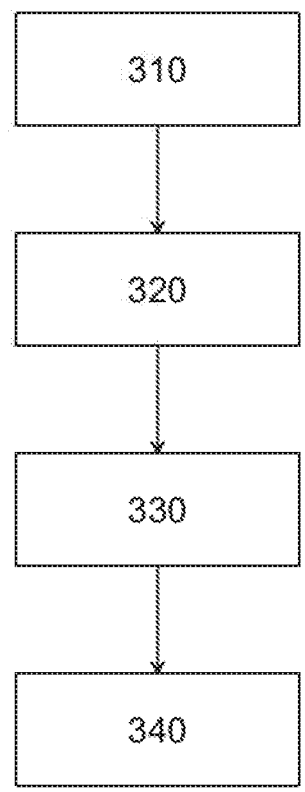
FIG. 7 shows a method for operating a system to measure the thickness of a print media according to a further example.

FIG. 7 shows an example of a method 300 for operating a system 100 comprising a platen or belt 110 for supporting a print media 130. The method 300 measures the thickness of the print media 130 by using a measurement bar 140 which extends to cover a width of the print media 130 when supported by the platen or belt 110. More specifically, the method 300 comprises moving the measurement bar to a first position 310 such as to contact a surface 120 of the platen or belt 110. As explained above, this corresponds to the example shown in FIG. 3, wherein the measurement bar 140 has been moved to abut the surface 120 of the platen or belt 110, wherein the area of the surface 120 being contacted by the measurement bar 140 does not support the print media 110 at the time of contact, while other regions of the surface 120 may support the print media 110.

The method 300 shown in FIG. 7 further comprises moving the measurement bar to a second position 320 such as to contact a surface 180 of the print media 130 when supported by the platen or belt 110. As explained above, this corresponds to the example shown in FIG. 4, wherein, for example, the measurement bar 140 can first be moved away from the platen or belt 110 such as to provide a gap allowing a conveyor belt 110 to move the print media 130 into the gap between the measurement bar 140 and conveyor belt 110, and then the measurement bar 140 can be moved to abut the surface 180 of the print media 130, such as to arrive at the second position shown in FIG. 4.

The method 300 shown in FIG. 7 further comprises measuring the thickness of the print media by determining the spatial difference between the first and second positions 330. As explained above, in the examples shown in FIGS. 3 and 4, the spatial difference corresponds to the vertical offset between the measurement bar 140 abutting the surface 120 of the platen or belt 110 (as shown in FIG. 3) and the measurement bar 140 abutting the surface 180 of the print media 130 (as shown in FIG. 4). Thus, in this example, determining the spatial difference between the first and second positions 330 corresponds to measuring the vertical offset between said first and second positions of the measurement bar 140.

By using a measurement bar 140 that covers the width of the print media 130 to perform the measurement, the measurement captures any shape or protrusion in the print media 130, platen or belt 110 representing the thickest point of the print media 130. Hence, the worst-case print media thickness measurement is delivered in an efficient and accurate manner, allowing a precise and reliable operation of the system.

As shown in FIG. 7, in an example, the method 300 can further comprise adjusting the distance between a printhead of the system and the print media for printing 340. In this example, the printhead can be included in a carriage 200 which is movably mounted on a slider beam 190 to allow scanning of the printhead, and adjusting the distance between the printhead and print media 340 can be based on the measured thickness of the print media. Hence, as the above thickness measurement of the print media 130 delivers the worst-case print media thickness, the distance between the printhead and print media can be adjusted 340 to allow a precise, safe and reliable operation of the system, in particular to avoid collision of the printhead and print media during printing operations, and to adjust the distance between the printhead and print media for improved print quality; see further discussion above.

In an example, the measurement bar 140 can include an alignment surface, such as for example the alignment surface 270 shown in FIG. 6. In this case, the method 300 can comprise moving the print media 130 to contact the alignment surface 270 of the measurement bar 140 such as to align the print media 130 along the alignment surface 270. For example, as explained above, the measurement bar 140 can be moved to a first position 310 to make contact with the surface 120 of the platen or belt 110. In this first position, the alignment surface 270 of the measurement bar 140 can be used for aligning the print media 130 along the alignment surface 270. An example of this operation is shown in FIG. 3, wherein the belt 110 or operator has moved the print media 130 to align against the alignment surface 270 of the measurement bar 140, when the measurement bar 140 has been moved to make contact with the surface 120 of the belt 110. In this way, the measurement bar 140 can be used for aligning the print media 130 and for measuring the thickness of the print media 130 in a combined manner, enhancing the efficiency of operating the system 100.

As explained above, in an example, a motorized guiding element 170 can be used for driving the respective movements of the measurement bar 140. In this example, the method 300 can comprise determining or estimating the torque applied by the motorized guiding element for moving the measurement bar, such as to detect if the measurement bar 140 contacts the surface 120 of the platen or belt 110, or the surface 180 of the print media 130. More specifically, if the measurement bar 140 is moved by a motorized guiding element 170 to abut a surface, the motorized guiding element 170 will experience a mechanical resistance affecting the torque of the motorized guiding element 170, which can be detected and used for touch detection in a precise and efficient manner. In an example, determining or estimating the torque applied by the motorized guiding element 170 can comprise determining the electrical current and/or electrical voltage used for driving an electrical motor 250 included in the respective motorized guiding element 170.

In a related example, the method 300 can begin with positioning the measurement bar 140 to contact the conveyor belt 110, so that the print media 130 can be aligned against the alignment surface 270 of the measurement bar 140 by an operator or the conveyor belt 110 arranging the print media 130. At this point, the respective first position of the measurement bar 140 is determined, for example by a positioning sensor implemented as a linear encoder to record the position of the measurement bar 140, corresponding to the surface 120 of the conveyor belt 110 supporting the lower face of the print media 130. Once done, the measurement bar 140 can be lifted to have the conveyor belt 110 advance the print media 130 to a position behind the measurement bar 140. In an example, this advancing of the print media 130 is performed automatically upon detecting that the measurement bar 140 has been lifted. Then, the measurement bar 140 can be lowered towards the surface 180 of the print media 130 (see FIG. 4), for example until a touch detector indicates that the surface 180 has been contacted. As explained above, if the measurement bar 140 is being moved by a motorized guiding element 170, the motorized guiding element 170 will experience a mechanical resistance when the surface 180 of the print media 130 has been reached, affecting the torque of the motorized guiding element 170, which can be detected and used for touch detection in a precise and efficient manner. Then, the linear encoder can record the second position of the measurement bar 140 corresponding to the upper surface 180 of the print media 130. It follows that the print media thickness can be measured by determining the spatial difference between the two positions recorded by the encoder.

In an example, the method 300 comprises moving the measurement bar 140 to the surface 180 of the print media 130 for providing user and/or system protection, for example when the print media 130 is being moved from the measurement bar 140 towards the printhead for printing. FIG. 4 shows a corresponding example wherein the measurement unit (not shown in figures) that is coupled to the measurement bar 140, moves the measurement bar 140 to the surface 180 of the print media 130, for example when the belt 110 is being operated to move the print media 130 from the measurement bar 140 towards the printhead for printing. In this way, the measurement bar 140 can be used as a cover or a protection unit during operation of the system 100, for example to prevent a user of the system 100 to be drawn into hazardous areas of the system, and/or to prevent undesired objects from entering and damaging the system 100. In this example, the measurement bar 140 can be moved to abut the surface 180 of the print media 130 during operation, for example by the roller 280 shown in FIG. 6. Alternatively, the measurement bar 140 can be moved to the surface 180 of the print media 130 to provide a gap between the measurement bar 140 and the surface 180 of the print media 130, for example a gap between 2 to 3 mm, to avoid print media 130 deformation. For example, the measurement bar 140 can prevent undesired objects, such as for example oversized print media 130, from being drawn into and damaging the system 100, for example during continuous printing when a print media 130 is being printed while another print media 130 in being introduced to the system 100. Similarly, the measurement bar 140 can be moved to the surface 180 of the platen or belt 110 to provide user and/system protection during printing operations.

In a further example, the thickness of a first print media 130 is determined while a second print media 130 is being printed by said printhead. This allows a safe, reliable and cost efficient operation of the system.

The invention claimed is:

1. A system comprising:
a platen or belt having a surface to support a print media;
a measurement bar arranged to cover a width of the print media when supported by the platen or belt;
a measurement unit coupled to the measurement bar such as to: move the measurement bar to a first position to contact said surface of the platen or belt, move the measurement bar to a second position to contact a surface of the print media when supported by the platen or belt, and measure a thickness of the print media by determining a spatial difference between the first and second positions;
a slider beam arranged in parallel with said surface of the platen or belt;
a carriage including a printhead, wherein the carriage is movably mounted on the slider beam to allow scanning of the printhead; and
an adjustment unit to adjust the distance between the printhead and print media for printing by using the measured thickness of the print media.

2. The system according to claim 1, wherein the measurement bar is arranged in parallel with said surface of the platen or belt to cover a width of the print media when supported by the platen or belt, or to cover a width of a maximum print media format for a respective printer.

3. The system according to claim 1, wherein the measurement unit is coupled to the measurement bar to move the measurement bar to the surface of the print media when the print media is being moved from the measurement bar towards the printhead for printing.

4. The system according to claim 1, comprising a guiding element arranged to guide said movement of the measurement bar or to provide a mechanical coupling between the measurement bar and the slider beam.

5. The system according to claim 4, wherein said guiding element is motorized to drive said movement of the measurement bar.

6. The system according to claim 5, wherein the measurement unit is coupled to said motorized guiding element to determine or estimate the torque applied by the motorized guiding element such as to detect if the measurement bar contacts the surface of the platen or belt, or the surface of the print media.

7. The system according to claim 1, wherein the measurement bar has at least one of: an alignment surface to align the print media along the alignment surface when the measurement bar has been moved to said first position, or a roller arranged to contact the surface of the platen or belt or the surface of the print media.

8. The system according to claim 1, comprising a reinforcement bar arranged in parallel with and coupled to the measurement bar.

9. A printer system comprising:
a platen or belt having a surface to support a print media;
a measurement bar arranged to cover a width of the print media when supported by the platen or belt;
a slider beam arranged in parallel with said surface of the platen or belt;
a carriage including a printhead, wherein the carriage is movably mounted on the slider beam to allow scanning of the printhead;
a measurement unit coupled to the measurement bar such as to: move the measurement bar to a first position to contact said surface of the platen or belt, move the measurement bar to a second position to contact a surface of the print media when supported by the platen or belt, and measure a thickness of the print media by determining a spatial difference between the first and second positions, wherein the measurement bar has an alignment surface to align the print media along the alignment surface when the measurement bar has been moved to said first position, and wherein the measurement unit is coupled to the measurement bar to move the measurement bar to the surface of the print media when the print media is being moved from the measurement bar towards the printhead for printing.

10. A method comprising:
moving a measurement bar to a first position such as to contact a surface of a platen or belt, wherein the surface of the platen or belt is to support a print media, and wherein the measurement bar extends to cover a width of the print media when supported by the platen or belt;
moving the measurement bar to a second position such as to contact a surface of the print media when supported by the platen or belt;
estimating or determining the torque applied by a motorized guiding element for moving the measurement bar, such as to detect if the measurement bar contacts the surface of the platen or belt, or the surface of the print media; and measuring a thickness of the print media by determining a spatial difference between the first and second positions.

11. The method according to claim 10, comprising adjusting a distance between a printhead and the print media by using the measured thickness of the print media, wherein the printhead is included in a carriage which is movably mounted on a slider beam to allow scanning of the printhead.

12. The method according to claim 10, comprising moving the print media to contact an alignment surface of the measurement bar such as to align the print media along the alignment surface when the measurement bar has been moved to said first position to contact said surface of the platen or belt.

13. The method according to claim 10, comprising moving the measurement bar to a surface of the print media when the print media is being moved from the measurement bar towards the printhead for printing.

* * * * *